April 11, 1961
W. BÜRKNER
2,979,105
METHOD AND APPARATUS FOR PRODUCING PARTICLE COMPOSITION PRODUCTS
Filed Jan. 14, 1959
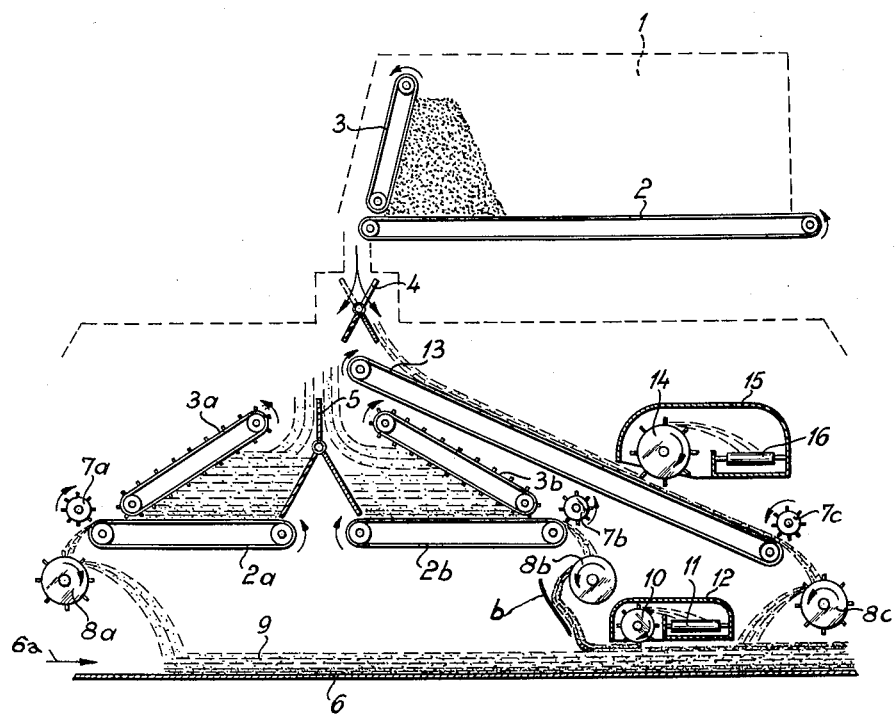
INVENTOR
Wolfgang Bürkner

United States Patent Office 2,979,105
Patented Apr. 11, 1961

2,979,105

METHOD AND APPARATUS FOR PRODUCING PARTICLE COMPOSITION PRODUCTS

Wolfgang Bürkner, Darmstadt, Germany, assignor of one-half to Carl Schenck Maschinenfabrik G.m.b.H., Darmstadt, Germany, a corporation of Germany, and one-half to Alwood Inc., Glarus, Switzerland, a corporation of Switzerland Filed Jan. 14, 1959, Ser. No. 786,740

Claims priority, application Germany Jan. 21, 1958

10 Claims. (Cl. 154—1)

My invention relates to the manufacture of pressed composition products from pourable particle stock and, in a preferred aspect, to the production of resin-bonded panels from comminuted wood or other fibrous stock.

Such composition panels are made by dispensing the binder-coated particle stock onto a suitable carrier, preferably a belt conveyor or a sequence of caul plates traveling on a roller conveyor. In this manner, there is formed a continuous and more or less felted mat of approximately uniform width and thickness, which is advanced into a panel press either as a whole or after being cut into mat pieces of the desired panel area. In the press, the mat or mat pieces are compressed and heated in order to produce the solid panel by compacting the mat and curing the binder usually consisting of thermosetting plastic.

In such manufacture, it is considered preferable to classify the finer particles from the coarser particles of the stock and to form the two surface zones of the mat predominantly from finer particles, and the interior zone from the coarser material. This entails certain disadvantages even if care is taken to classify the stock before dispensing it onto the mat-carrying surface so that virtually only coarse particles are located in the interior of the mat. These disadvantages are due to the fact that layers formed of predominantly coarse particle material are apt to contain hollow spaces which are detrimental to the homogeneity of the final product made from the mat. Furthermore, since the binding agents being used adhere to the coarser particles in comparatively smaller quantity than to the finer wood shavings or particles, the binder distribution tends to be greatly non-uniform. Both effects are detrimental, mainly with respect to the tensional strength or shearing strength of the finished wood-composition panels, because the strength of the products is determined, aside from the natural properties of the stock particles, by the quantity, quality and distribution of the binding agent.

It is an object of my invention to devise a method and apparatus that afford the production of wood-composition panels and similar products of better quality, from the above-mentioned aspects, than the products of the known method of manufacture.

According to my invention, a mixture of coarse and fine particles is supplied to a series of dispensing stations which follow each other in the longitudinal direction of the traveling carrier surface or conveyor on which the mat of particle stock is to be formed, the series comprising preferably three or more dispensing stations. In one, or both, of the dispensing stations located at the forward or rear ends of the dispenser series, depending upon whether a panel with only one smooth surface or with smooth surfaces on both sides is to be produced, the mixture of particle stock is distributed onto the carrier surface by a classifying throw in the longitudinal direction so that the mixture becomes dispersed and partially separated due to the fact that the thicker and heavier particles are thrown farther away than the thinner and lighter particles. In this manner, the lower or upper surface layer of the mat, or both layers as the case may be, are preferentially formed of fine particles, whereas the coarser particles of the mixture supplied to the endwise located dispensing station are placed toward the interior of the mat body. In contrast to the classifying throw just mentioned, an ordinary sprinkling action is used in the other dispensing station or stations, so that the interior zone of the mat is formed by coarse and fine particles mixed in substantially the same proportion as the original mixture of stock fed to the latter dispensing localities.

According to another feature of my invention, it is preferable to keep the quantity of stock dispensed at the classifying dispensing stations greater than the quantity dispensed at the other localities, namely so that the indiscriminately dispensed mixture of coarse and fine particles contributed by the intermediate dispensers is approximately equal to the quantity of coarse material contributed to the inner zone by the classifying throw-action stations.

Leveling devices may be used for smoothing the top surface of the mat and to equalize any excessive amounts or peaks of dispensed stock material. Any such excess is preferably returned to the magazine or bin from which the mixture of particle stock is fed to the dispensing stations.

It will be recognized that in products made according to my invention, the main content of stock material in the interior of the mat or panel no longer consists predominantly of coarse material, but that intentionally a considerable share of finer material is added so that the resulting product possesses in its interior a composition of better quality than heretofore attainable in products made by the above-mentioned known method. The share of fine material in the interior can be varied by varying the relative quantities of stock materials supplied by the respective dispensing stations, in accordance with the properties desired in the finished product, and depending upon the properties of the stock material being used. The relative proportions of coarse and fine particles can be adjusted or regulated, for example by correspondingly regulating the dispensing quantity of the respective dispensing devices. When using rotating dispenser drums in the respective dispensing devices, an increase in speed of the classifying dispenser drums will place a larger quantity of fine material into the surface layers and a smaller quantity of coarse material into the interior zone of the product. In each case the best suitable speed or speed ratio can be determined by sample testing for each particular type of stock material being used.

The invention will be further described with reference to the drawing showing schematically a plant according to the invention for the production of a continuous mat of wood shavings, which mat is to be cut into individual pieces of an area corresponding to that of the panel to be produced in a pressing station (not illustrated). The particular plant shown comprises three stock dispensing stations spaced from each other in the traveling direction of a forming conveyor for supporting the mat.

The plant comprises a storage bin 1 for particle stock consisting of a mixture of coarse and fine particles, all of pourable size. The bottom of bin 1 is formed by an endless belt conveyor 2. The front wall is formed by an endless scraper belt 3 which extends from conveyor belt 2 in the upward direction and has an upward travel at the side facing the stored quantity of stock. Belts 2 and 3 form between each other a horizntal slot near the forward travel end of conveyor 2 for dispensing the stock material.

From bin 1 the discharged particle stock passes along adjustable guiding flaps 4 and 5 onto two endless belt conveyors 2a, 2b, from which the stock is dispensed, by means of dispensing devices described below, onto a carrier surface formed by a conveyor 6 traveling in the direction indicated by an arrow 6a. The conveyor has a planar horizontal carrier surface for the mat to be formed, the width of this surface corresponding to that of the mat. The conveyor 6 may otherwise be of any desired type. For example, it may consist of an endless belt or of an uninterrupted sequence of caul sheets traveling on conveyor rollers. Located above the belts 2a and 2b are respective endless belts 3a and 3b each of which extends, in an inclined direction upward and away from a location close to the discharging end of the conveyor 2a or 2b. The belts 3a, 3b are provided with scraper members to secure a uniform discharge of stock from belt 2a or 2b along the entire width of the belt which corresponds to the width of conveyor 6. The seven cooperating belts 2, 2a, 2b, 3, 3a, 3b and 6 are driven to move in the directions indicated by respective arrows.

Tear-off drums 7a and 7b, rotating in the indicated directions, assist in obtaining a uniform discharge of a veil of particles from respective conveyor belts 2a, 2b onto respective dispensing drums 8a, 8b.

The drum 8a, located at the rear end of the entire series of dispensing stations relative to the traveling direction of the forming conveyor 6, is operated at the speed required to produce a sufficient throwing action. The particles are thus flung by drum 8a in the forward direction with the above-mentioned effect of dispersing and generally separating the fine particles from the coarse particles. The fine particles reach the conveyor surface at a location where no other particle material is as yet deposited. Consequently, the lowest surface layer of the mat 9 being formed consists predominantly of fine particles, whereas the coarser particles are flung by drum 8 farther away onto a layer of finer particles already deposited, so that these coarser particles will subsequently be located in or toward the inner zone of the mat.

The drum 8b of the intermediate dispensing station may be operated at lower speed, so that it simply sprinkles the mixture of particle material without appreciable throw onto the mat portion previously formed by the operation of the throw-action drum 8a. However, it is preferable to provide a baffle near the drum as shown at b. The baffle, consisting of a sheet member, has the effect that the mixture of coarse and fine particles reaches the mat in mixed condition. Consequently, the particle quantity deposited by the action of drum 8b is composed of coarse particles as well as of a considerable quantity of fine particles.

In order to equalize the mat surface and the penetration of the just-mentioned mixture into the interior of the mat, a spike drum 10, or other leveling device, is mounted in front of the drum 8b. The spike roller 10 removes any excessive peaks of material and throws the excess upon an endless conveyor belt 11 which passes the excess laterally away from the mat. The spike drum 10 and the conveyor 11 operate under a protective hood 12.

The third dispensing station may be located directly in front of the hod 12. The dispensing drum 8c of the latter station is supplied with a mixture of particle stock by means of a feeder conveyor 13 with the aid of the tear-off drum 7c, and is operated at relatively great speed in order to have a classifying throw-action, as described above with reference to drum 8a. As a result, the coarser particles of the mixture supplied to drum 8c are flung farther toward the rear than the finer particles. Thus, the material supplied by the throw-action drum 8c supplements the relatively coarse particles in the interior of the mat and covers them with a layer of fine particles which form the top surface of the mat now ready for further fabrication.

It is preferable, as illustrated, to provide an auxiliary dosage control station for cooperation with the feeder conveyor 13. This auxiliary station comprises a spike drum 14, a protective hood 15, and an endless belt conveyor 16 extending transversely of the belt 13. By controlling the rotating speed of spike drum 14, the quantity of stock fed to the third dispensing station can be adjusted or regulated.

The excessive material removed by means of the conveyor belts 11 and 16 can be returned into the bin 1 from which all dispensing stations are fed.

It is of advantage in many cases to operate the intermediate dispensing station, comprising the conveyor belt 2b and the drum 8b, so that the quantity of stock material dispensed in the intermediate station is approximately equal to the total quantity dispensed by both other dispensing stations plus any excess of material desired for equalizing purposes. The dispensing capacity of the individual stations corresponding to conveyor belts 2a, 2b, 13, and any degree of classifying action that may be required by the type, composition and humidity of the stock material, can readily be adjusted by correspondingly varying or setting the rotating speed of the dispenser drums. For this purpose, the drums 8a and 8b are preferably driven by stepless speed-change drives so that their peripheral speed can be varied within a range of up to 350 meters per minute approximately. In general, the speed control range of the drum 8b is to be rated about 20% smaller than that of the throw-action dispenser drums.

The surface of the rotating dispenser drums is preferably smooth or only slightly roughened. It is also preferable, depending upon the type of the stock to be dispensed, to provide the drum surfaces with relatively slight irregularities in the form of bosses, ridges or other protuberances whose radial height is small in comparison with the diameter of the cylindrical drum surface, such protuberances being schematically indicated on the drawing.

Instead of using the throw-action drums described above, the desired classification and dispersion of the mixture of coarse and fine particles at the place of their deposition onto the mat-carrying surface can also be obtained by other classifying means of conventional type. For example, vibratory classifying means or similar shaker screens may be used, or the separation of the coarse and fine particles may be effected by air sizing, namely by subjecting the dispensed mass to a current of air which distributes the particles by gravitation and inertia. The described rotating drums have been found particularly favorable for throw-action classification, particularly if they have a relatively smooth surface or only slight surface irregularities as mentioned above. By regulating the air velocity used for air sizing, or the rotating speed of the classifying drums, the classifying action of each of these means can be satisfactorily controlled and regulated within sufficiently wide limits.

The invention is not limited to plants with only three dispensing stations. If more stations are used, the supply of particle stock to form the core zone of the mat should be controllable so as to provide each of the intermediate dispensing stations with a properly selected share of stock.

Such and other modifications will be obvious to those skilled in the art upon a study of this disclosure, and it will therefore be understood that the invention may be embodied in devices other than particularly illustrated and described herein, without departing from the essence of my invention and within the scope of the claims annexed hereto.

I claim:

1. In the manufacture of pressed composition products from a continuously formed mat of particle material of approximately uniform mat width and thickness, the method comprising the steps of supplying a mixture of coarse and fine particles to a series of dispensing stations following each other in the longitudinal direction of the mat to be formed, one of said stations being located at an end of the series, dispensing the mixture in said one dispensing station upon an advancing carrier by classifying throw in said longitudinal direction to generally separate fine particles from coarse particles whereby a surface zone of the mat being formed is predominantly composed of fine particles, and dispensing the mixture in another one of said stations onto the carrier by substantially indiscriminate sprinkling so as to form another mat zone of coarse and fine particles mixed substantially in the same proportion as the mixture supplied to said other station.

2. In the manufacture of pressed composition products from a continuously formed mat of particle material of approximately uniform mat width and thickness, the method comprising the steps of supplying a mixture of coarse and fine particles to a series of dispensing stations following each other in the longitudinal direction of the mat to be formed, two of said stations being located at the respective ends of the series, spraying the mixture at each of said two end stations upon the carrier by classifying throw in said longitudinal direction to generally separate fine particles from coarse particles whereby the two surface zones of the mat being formed are predominantly composed of fine particles, and dispensing the mixture in another one of said stations onto the carrier by substantially indiscriminate sprinkling to form an interior mat zone of mixed coarse and fine particles.

3. In the method according to claim 1, the quantity of the mixture dispensed in mixed condition in said other station being larger than the total quantity dispensed in said one station and being approximately equal to the share contributed to said other mat zone by the coarse particles dispensed in said one zone.

4. In the method according to claim 2, the total quantity of the mixture dispensed in said two end stations being larger than the total quantity dispensed intermediate said end stations and being substantially equal to the share contributed in said end stations to said interior mat zone.

5. Apparatus for forming particle material into a mat of approximately uniform width and thickness for the production of pressed composition products, comprising a conveyor having a carrier surface advancing in a given longitudinal direction, a series of dispenser means following each other in said direction and having respective particle-dispensing means located above said surface, container means for storing a mixture of coarse and fine particle stock, feeder means extending from said container means to said respective dispenser means, one of said dispenser means being located at an end of said series and having a driven throw-action member for disposing the dispensed mixture upon said surface, said member having a throw direction longitudinally of said surface and a speed sufficient to throw coarse particles farther than fine particles whereby said one dispenser means produces a mat surface zone preferentially composed of fine particles, and another one of said dispenser means having a dispenser device of substantially indiscriminate sprinkling action for producing another mat zone of coarse and fine particles mixed substantially in the same proportion as the mixture fed to said other dispenser means.

6. Apparatus for forming particle material into a mat of approximately uniform width and thickness for the production of pressed composition products, comprising a conveyor having a carrier surface advancing in a given longitudinal direction, a series of dispenser means following each other in said direction and having respective particle-dispensing means located above said surface, container means for storing a mixture of coarse and fine particle stock, feeder means extending from said container means to said respective dispenser means, the two dispenser means of the respective ends of the series having respective rotatable throw-action drums transverse of said surface for dispersing the dispensed mixture upon said surface, each of said two drums having a throw direction longitudinally of said surface and a rotating speed sufficient to fling coarse particles farther than fine particles whereby each of said two dispenser means produces one of the respective surface zones of the mat preferentially from fine particles, and the intermediate dispenser means of the series having substantially indiscriminate sprinkling action for producing an interior mat zone of coarse and fine particles mixed substantially in the same proportion as the mixture fed to said intermediate dispenser means.

7. In apparatus according to claim 6, said intermediate dispenser means having a rotatable dispenser drum extending transversely of said surface and having lower rotating speed than said throw-action drum.

8. In apparatus according to claim 6, said rotatable drums having a substantially smooth cylindrical surface.

9. In apparatus according to claim 6, said rotatable drums having a generally smooth cylindrical surface and having protuberances distributed over said cylindrical surface, said protuberances having slight radial length relative to the cylinder diameter.

10. In apparatus according to claim 6, said intermediate dispenser means having a rotatable dispenser drum extending transversely of said surface, and a baffle-surface member dispersed near said latter drum at the dispensing side thereof, for maintaining the dispensed particle material in mixed condition.

References Cited in the file of this patent

UNITED STATES PATENTS

| | | |
|---|---|---|
| 2,635,301 | Schubert et al. | Apr. 21, 1953 |
| 2,737,997 | Himmelheber et al. | Mar. 13, 1956 |
| 2,743,758 | Uschmann | May 1, 1956 |
| 2,744,848 | Mottet | May 8, 1956 |
| 2,746,895 | Duvall | May 22, 1956 |